(12) United States Patent
Mashaal et al.

(10) Patent No.: US 11,050,811 B2
(45) Date of Patent: Jun. 29, 2021

(54) SYSTEM AND METHOD FOR MESH NETWORK STREAMING

(71) Applicant: PRESSTO, INC., New York, NY (US)

(72) Inventors: Adam Mashaal, New York, NY (US); Clarence Huang, New York, NY (US)

(73) Assignee: PRESSTO, INC., New York, NY (US)

( * ) Notice: Subject to any disclaimer, the term of this patent is extended or adjusted under 35 U.S.C. 154(b) by 0 days.

(21) Appl. No.: 16/495,691

(22) PCT Filed: Mar. 22, 2018

(86) PCT No.: PCT/US2018/023848
§ 371 (c)(1),
(2) Date: Sep. 19, 2019

(87) PCT Pub. No.: WO2018/175781
PCT Pub. Date: Sep. 27, 2018

(65) Prior Publication Data
US 2020/0099735 A1 Mar. 26, 2020

Related U.S. Application Data

(60) Provisional application No. 62/475,031, filed on Mar. 22, 2017, provisional application No. 62/475,040, filed on Mar. 22, 2017.

(51) Int. Cl.
*H04L 29/08* (2006.01)
*H04L 29/06* (2006.01)
(Continued)

(52) U.S. Cl.
CPC ............ *H04L 67/02* (2013.01); *G06F 21/572* (2013.01); *G06T 9/20* (2013.01);
(Continued)

(58) Field of Classification Search
CPC . H04L 67/02; H04L 29/08072; H04L 67/104; H04L 67/42; H04L 69/329;
(Continued)

(56) References Cited

U.S. PATENT DOCUMENTS 7,953,820 B2   5/2011 Stevens et al.
8,699,377 B2   4/2014 Veillette
(Continued)

OTHER PUBLICATIONS

International Search Report and Written Opinion in corresponding International Application No. PCT/US2018/023848 dated Jun. 1, 2018 (10 pages).

*Primary Examiner* — Michael A Keller
(74) *Attorney, Agent, or Firm* — Jeffri A. Kaminski; Venable LLP (57) ABSTRACT

Systems, methods, and computer-readable storage media for streaming content, and specifically browser content, across devices in a mesh network. This occurs by receiving, at a first mobile device in mesh network, instructions from a second mobile device in the mesh network, the instructions directing the first mobile device to load content from a website, where the instructions are sent based on the second mobile device loading the content from the website. The first mobile device receives the content from the website, loads/processes the website content, and displays the content. When the first mobile device receives a patch directed to modifications to a Document Object Model (DOM) in the content which occurred on the second mobile device, the first mobile device modifies the content on the first mobile device based on the patch.

14 Claims, 5 Drawing Sheets

(51) Int. Cl.
    *H04N 21/234*    (2011.01)
    *G06F 21/57*     (2013.01)
    *G06T 9/20*      (2006.01)

(52) U.S. Cl.
    CPC ...... *H04L 29/08072* (2013.01); *H04L 67/104* (2013.01); *H04L 67/42* (2013.01); *H04L 69/329* (2013.01); *H04N 21/234* (2013.01)

(58) Field of Classification Search
    CPC ......... H04L 29/08; H04L 67/14; H04L 67/28; H04N 21/234; G06F 21/572; G06F 15/76; G06T 9/20
    See application file for complete search history.

(56) References Cited

U.S. PATENT DOCUMENTS

| | | | |
|---|---|---|---|
| 2015/0143395 A1* | 5/2015 | Reisman | H04N 21/47202 725/14 |
| 2016/0029403 A1* | 1/2016 | Roy | H04W 28/0278 370/336 |
| 2017/0011133 A1 | 1/2017 | Shalunov et al. | |
| 2017/0078087 A1* | 3/2017 | Chalker | H04L 9/0872 |
| 2017/0345075 A1* | 11/2017 | Khandelwal | G06Q 30/0623 |
| 2019/0036908 A1* | 1/2019 | Liu | H04L 63/0823 |
| 2019/0325485 A1* | 10/2019 | Tully | G06F 16/9535 |

\* cited by examiner

SYSTEM AND METHOD FOR MESH NETWORK STREAMING

PRIORITY

This application is a U.S. National Stage application of PCT/US2018/023848, filed Mar. 22, 2018 and published on Sep. 27, 2018 as WO/2018/175781, which claims the benefit of U.S. Provisional Application Nos. 62/475,031, filed Mar. 22, 2017 and 62/475,040, filed Mar. 22, 2017, the contents of which are hereby incorporated by reference in their entireties.

BACKGROUND

1. Technical Field

The present disclosure relates to streaming content over a mesh network, and more specifically to reducing the bandwidth required to effectively communicate content across a mesh network.

2. Introduction

Mesh networks allow for nodes to communicate directly with other nodes in the network. For example, cell phones in a mesh network of cell phones can communicate directly with one another, cell phone to cell phone, rather than utilizing a repeater or access point to relay messages between the cell phones. While mesh networks can, in some configurations, be used to reduce infrastructure requirements such as repeaters or access points, in other configurations the reliance on other nodes can inhibit or restrict the flow of data to one or more nodes. For example, if a single node in a mesh network is communicating with an Internet access point, forwarding data from the access point to nodes on the mesh network, that node may act as a bottleneck for data being forwarded to the other nodes. This bottleneck can be particularly acute in instances where content is being streamed to a node, such that content is constantly being received.

SUMMARY

An exemplary method for performing concepts disclosed herein can include: receiving, at a first mobile device in mesh network, instructions from a second mobile device in the mesh network, the instructions directing the first mobile device to load content from a website, wherein the instructions are sent based on the second mobile device loading the content from the website; retrieving, at the first mobile device and via the mesh network, the content from the website; loading, via a processor on the first mobile device, the content from the website on a display of the first mobile device; receiving, at the first mobile device, a patch directed to modifications to a Document Object Model (DOM) in the content which occurred on the second mobile device; and modifying the content on the first mobile device based on the patch.

An exemplary system configured according to the concepts disclosed herein can include: a processor; and a computer-readable storage medium having instructions stored which, when executed by the processor, cause the processor to perform operations comprising: receiving, at a first mobile device in mesh network, instructions from a second mobile device in the mesh network, the instructions directing the first mobile device to load content from a website, wherein the instructions are sent based on the second mobile device loading the content from the website; retrieving, at the first mobile device and via the mesh network, the content from the website; loading, on the first mobile device, the content from the website on a display of the first mobile device; receiving, at the first mobile device, a patch directed to modifications to a Document Object Model (DOM) in the content which occurred on the second mobile device; and modifying the content on the first mobile device based on the patch.

An exemplary non-transitory computer-readable storage medium configured according to the principles disclosed herein can have instructions stored which, when executed by a computing device, cause the computing device to perform operations which can include: receiving, at a first mobile device in mesh network, instructions from a second mobile device in the mesh network, the instructions directing the first mobile device to load content from a website, wherein the instructions are sent based on the second mobile device loading the content from the website; retrieving, at the first mobile device and via the mesh network, the content from the website; loading, on the first mobile device, the content from the website on a display of the first mobile device; receiving, at the first mobile device, a patch directed to modifications to a Document Object Model (DOM) in the content which occurred on the second mobile device; and modifying the content on the first mobile device based on the patch.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Disclosed herein are techniques for streaming document object model (DOM) data. DOM streaming may be used as a mechanism for streaming browser based content, such as a web browsing session. Using the techniques disclosed herein, a broadcasting user may conduct a browsing session, and the browser session may be streamed in real-time to one or more receiver nodes (e.g., mobile phones, computers, etc.). Users at the receiver nodes may observe and/or interact with the browsing session. To enable such functionality, the logical structure of a web page, such as a hypertext markup language (HTML) of the page, may be treated as the source content and streamed to a destination browser-based viewer. This content is reconstructed on the viewer side to form a coherent display, such as an HTML page that can be then viewed by the viewer.

In some configurations, a virtual DOM representing the browsing session can be generated and the virtual DOM may be updated every frame. The updates based on virtual DOM diffs are sent to one or more receiver nodes. The receiver takes a stream of virtual DOM updates from the broadcaster and plays it back on its own browser to generate a smooth and real-time streaming experience. A user of the receiver device may then observe and/or interact with the broadcasting user's browsing session.

In some configurations, the user of a receiving device observes the browsing session and at a certain point takes over the browsing session. At this point, the receiving user may be actively engaging with the browser independent of the broadcaster (e.g., in a traditional browsing session). The receiving user may also elect to become a broadcasting user, and the browsing session may then be broadcast to other users using the techniques disclosed herein.

Additional features may be provided in conjunction with the streamed browsing session. In one example, a front-facing video camera window (PIP) may be displayed over the browser window allowing the broadcaster to provide commentary on the browsing session. A chat window may also be provided for receiving users and broadcasting users to talk with each other (e.g., share web links, suggestions, etc.). In another example, web links shared from a stream may be converted into an affiliate referral link, so any web purchases made thereafter result in the streaming platform owner obtaining an affiliate referral fee. In a further example, certain hosts are verified so they can earn a share of all affiliate referral fees made as a result of links shared from their stream. A stylized cursor may also be displayed over a broadcasted website depicting where the host and any other users are tapping on the webpage. In certain cases, the cursor could be presented as either the name or the profile image of the user making the action. An option may be provided for a host or viewer to share a link pointing to any stream (e.g., post a link to Twitter), which would allow their friends to view the stream on their own mobile or desktop browser without having the app installed. An option may be provided to broadcast a stream on a third-party streaming platform such as Twitch, Facebook Live, YouTube Live, and the like. Functionality may be provided to present users with a list of suggested websites to stream based, for example, on human curation, artificial intelligence (AI) based on browsing history, sponsored listings, and/or other information. A popularity index may be generated with an option of displaying a list of the most popular websites being streamed based on various metrics (e.g., total number of views across all users over a certain time period, velocity of views over a certain time period, etc.).

Also disclosed herein are mesh networking techniques. In some configurations, the network can include a relay server, backbone nodes, client nodes, and/or other elements. The relay server can act as a router, distributing information to each of the client devices. In such configurations, upon connection to the mesh network, each client device first talks to the relay server in order to obtain a list of its peers (e.g., devices already connected to one another within the mesh network). The relay server has a master list of all nodes in the network. The relay server may use location data, such as geographical positioning provided by the client's GPS (Global Positioning System), triangulation data, etc., as well as network topology data (IP addresses, etc.) based on connectivity mapping, to efficiently govern data transfer among the client, relay, and backbone nodes in the network. Each of the one or more client devices may include its own server, client, and/or relay. Each client device may also make connections and/or link with other clients.

Networking is often a tradeoff between latency and bandwidth. In one exemplary mesh network configured according to principles disclosed herein, the bandwidth concerns can be mitigated by using the voting algorithms disclosed herein. That is, by electing specific nodes to be gateway nodes which direct traffic, in the specific manner disclosed herein, bandwidth congestion can be improved. Regarding latency management, this same smart routing/voting can deploy "simulated routes" before connecting peers. This modeling can model both the number of hops required to transmit data between nodes, as well as the latency increase across those hops, and use that information to determine connections which have reduced latency.

In one example, before each connection is made, a twenty four kb test packet of data is sent between two candidate peers in order to test their latency across a particular topology. twenty four kb can be selected because this is the typical payload for a DOM streaming application. After this data is transmitted, the latency and bandwidth can be compared against a baseline QOS (quality of service) metrics which are determined empirically. If the metrics are satisfied, a connection is made.

In some configurations, the mesh network disclosed herein can be characterized by dynamic self-organization, self-configuration and self-healing to enable quick deployment, easy maintenance, low cost high scalability and reliable services. The underlying protocol which powers the mesh network has several unique features which enable low-latency, high bandwidth connections.

In some configurations, the entire topology of the network and the relay nodes can be used to transmit data between unreliable links. This mesh topology can provide high reliability and path diversity against node and link failures. In certain cases, each node can maintain its own lookup table of alternate links which can be used to reconstruct the topology of the mesh should any active link fall out of connectivity, or if a node containing the "master" list of active nodes should go inactive.

One issue relevant to traditional mesh networks is the high throughput unfairness faced by the nodes in the system. In some previous mesh networks, a mesh network is said to be exhibiting high throughput fairness if all nodes receive equal throughput under similar situations of source traffic and network load. However, these traditional mesh networks show high throughput unfairness among the contending traffic flows. That is, how the network distributes data, and otherwise allocates bandwidth, may be suboptimal in configurations where each node is provided equal throughput.

In one exemplary configuration of the disclosed invention, the mesh network addresses throughput unfairness by employing a bandwidth based protocol that allocates node connectivity via a lookup heuristic table. By exposing a global rule for traffic allocation, the wireless network disclosed herein can solve the information asymmetry problem that causes throughput unfairness in typical mesh networks.

In some configurations, the mesh network architecture disclosed herein can be configured to provide optimal performance for streaming applications, such as browser session streaming from a first client to one or more other clients. The techniques disclosed herein may, for example, enable the streaming of DOM based content across a wireless mesh network for the purpose of broadcasting real-time browser based streaming content across multiple users.

In many mesh networks, a simple "broadcast" approach is used, where every modification to a DOM structure is broadcast to all nodes within the mesh network. This can result in wasted bandwidth and inefficiencies. One way of mitigating these inefficiencies is through the use of a centralized gateway node, where one node is designed to direct traffic within the network. However, the downside of a centralized gateway node is that it results in a single point of failure, where losing the centralized gateway node can effectively destroy/limit the ability for the network to operate.

Mesh networks configured as disclosed herein can adopt a hybrid approach, where periodically (e.g., at set time periods, after a set amount of traffic, etc.) the active nodes on a network vote to determine which node will be the temporary gateway node. Preferably, each node within the network is provided a number of "stakes," or votes, based on the amount of traffic going through that node. In some configurations, the number of stakes can be linearly associated with the traffic (e.g., 5 votes for 5 Mb of traffic, 7 votes for 7 Mb of traffic), whereas in other configurations the number of stakes can be non-linearly related to the traffic (e.g., 3 votes for 5 Mb of traffic, 6 votes for 6 Mb of traffic, 10 votes for 7 Mb of traffic).

With each round of voting, a new, temporary centralized gateway node is established which can direct traffic within the network. This process is repeated as nodes are added, withdrawn, or as the network topology otherwise changes.

The disclosed invention provides for technological improvements over prior methods for streaming content over mesh networks. Specifically, the disclosed improvements allow for reduced latency in streaming content from one node to another within a mesh network. This reduced latency is due in part to allowing a reduction in data being transmitted across the mesh network (i.e., bandwidth savings), which in turn reduces the amount of processing the receiving device must perform to display streamed changes. In this manner, the amount of content being transmitted is reduced, and the processing being performed is similarly reduced, thereby increasing the processing capacity of the overall system. Also, the security of the data being transferred from a first device to emulating/streaming devices is maintained at the same level as previous hashing algorithms, but the processing required on the hashed output is significantly reduced.

Figure 1:
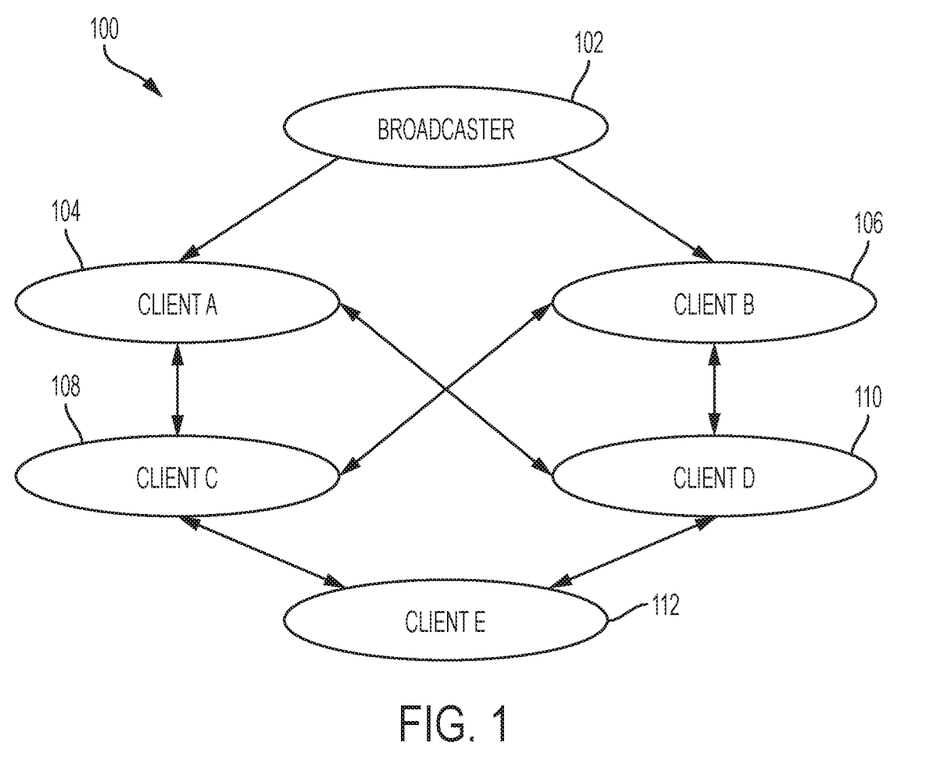
FIG. 1 illustrates an example mesh network.

FIG. 1 depicts an example diagram of a mesh network 100 configured to stream document object model (DOM) data. A broadcaster 102 may transmit data associated with a DOM to one or more receivers 104, 106 via a network 100 (e.g., a cellular network, wide area network (WAN), local area network (LAN), etc.). The nodes 102, 104, 106, 108, 110, 112 can be computing devices such as a mobile device, desktop computer, server, and/or other computing device. The broadcaster 102 may, in a first example, have data which needs to be communicated to another node in the mesh network 100. In another example, the broadcaster 102 may be an access point, having access to the Internet, a database, or other repository of information. The broadcaster 102 may be included in and/or associated with a streaming application (e.g., a web browser streaming application), web browser, video player, and/or other component of a computing device. The receiver device(s) 104, 106, 108, 110 may similarly be associated with mobile devices, desktop computer, and/or other computing devices.

Each node, or device, within the mesh network may communicate with other nodes according to location, geography, and/or capabilities of the respective devices. For example, if Client C 108 needs information from a broadcaster 102, but Client C 108 is not within range to receive information from the broadcaster 102 and Clients A 104 or B 106 are within range of both the broadcaster 102 and Client C 108, then Clients A 104 or B 106 may be used to relay the information from the broadcaster 102 to Client C 108. In this manner, the nodes may function as relay nodes. Likewise, in some configurations some nodes within the mesh network 100 may be nodes with a relatively higher quality connection to other nodes of the mesh network, and may be considered "backbone" nodes.

Figure 2:
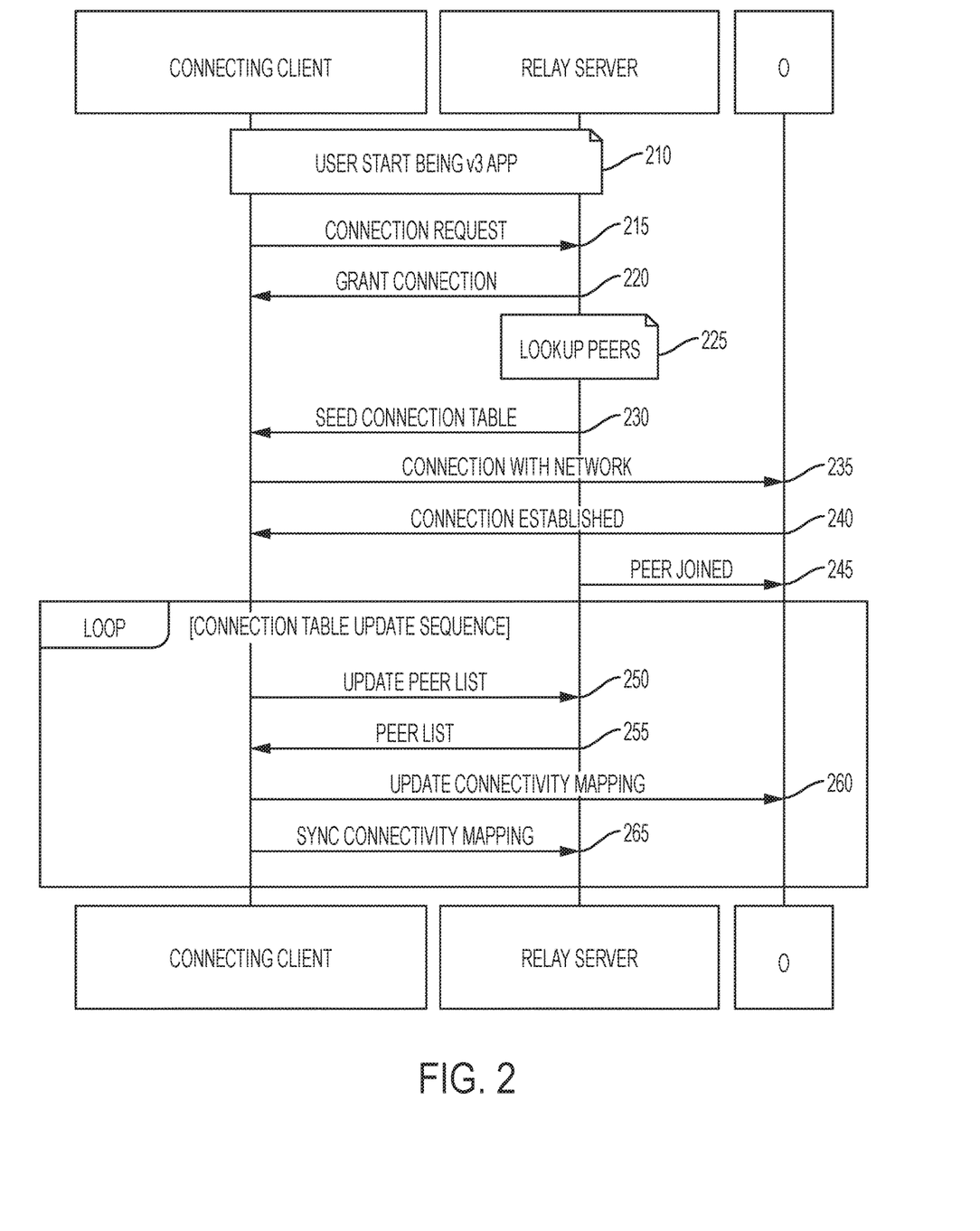
FIG. 2 illustrates an exemplary sequence of connecting to a mesh network.

FIG. 2 is an example schematic diagram of a sequence of connecting to the mesh network. In the example shown, an application instance can be opened (210) at a client device. The client device can send (215) a connection request to the relay server. The relay server receives the connection request, evaluates the connection request (e.g., to identify the client), and/or determines that the client should be connected to the mesh network. In certain cases, the client node may authenticate itself with the relay server using, for example, security credentials such as digital certificates, a symmetric key (e.g., generated from tamper-proof hardware IDs), an asymmetric key, and/or other information.

The relay server can then send (220) the client device a message indicating the connection has been granted. The relay server may identify (225) peers in the mesh network, and a connection table can be updated to include the client and/or other peers in the mesh network. A connection table at the client device may, for example, be seeded (230) with the peers identified at the relay server. In some cases, the connection table may be sent from the relay server to the client device, and may include a list of peers (other nodes) within the mesh network. The connection table may include a list of clients logged in and/or active in the mesh network, identifying information for the client devices, and/or topology information. The topology information may, for example, be used to determine a link between client and other peers in the network. Where the connection table is stored may vary from configuration to configuration. For example, in some configurations, the client devices within the mesh network may individually store the connection table, such that when nodes connect/disconnect from the mesh network, the connection table of in the nodes which have/had direct communication with the connecting/disconnecting node is modified, then propagated to other nodes within the mesh network. In other configurations, the connection table may be stored at the relay server, and may be the only complete list of connections available. In yet other configurations, the relay server may have a "master" copy of the connection table, with copies of the connection table propagated to the nodes/client devices within the mesh network as required.

After authenticating with the relay server, seeding the connection table, and/or performing other operations, the client connects (235) to the mesh network. A connection is established (240) between the network and the client.

The connection table may be updated as clients enter and/or exit the network. For example, a peer may join (245) the network. The client device may then determine that the additional peer has been added to the network. The client device may update (250) the peer list at the relay server. For example, the client may pass information identifying the additional peer to the relay server. The relay server can then update the peer list and/or connection table. The updated peer list and/or connection table can be passed (255) to the client device, or to other clients within the network. The client can update (260) its network connectivity mapping (e.g., connection table) based on, for example, the updated peer list. In certain cases, the client device may ping various nodes (e.g., other nodes/clients, peers, etc.) to update and validate its connectivity mapping. The client can synchronize (265) the connectivity mapping with the relay server. For example, the connection table may be updated based on the addition or removal of peers from the network.

The connection table can be continuously updated and steps 250-265 can be repeated as peer nodes/devices enter and exit the mesh network. Peers may enter and exit the network by logging in or logging out of the network. The steps outlined herein are exemplary and can be implemented in any combination thereof, including combinations that exclude, add, or modify certain steps.

Figure 3:
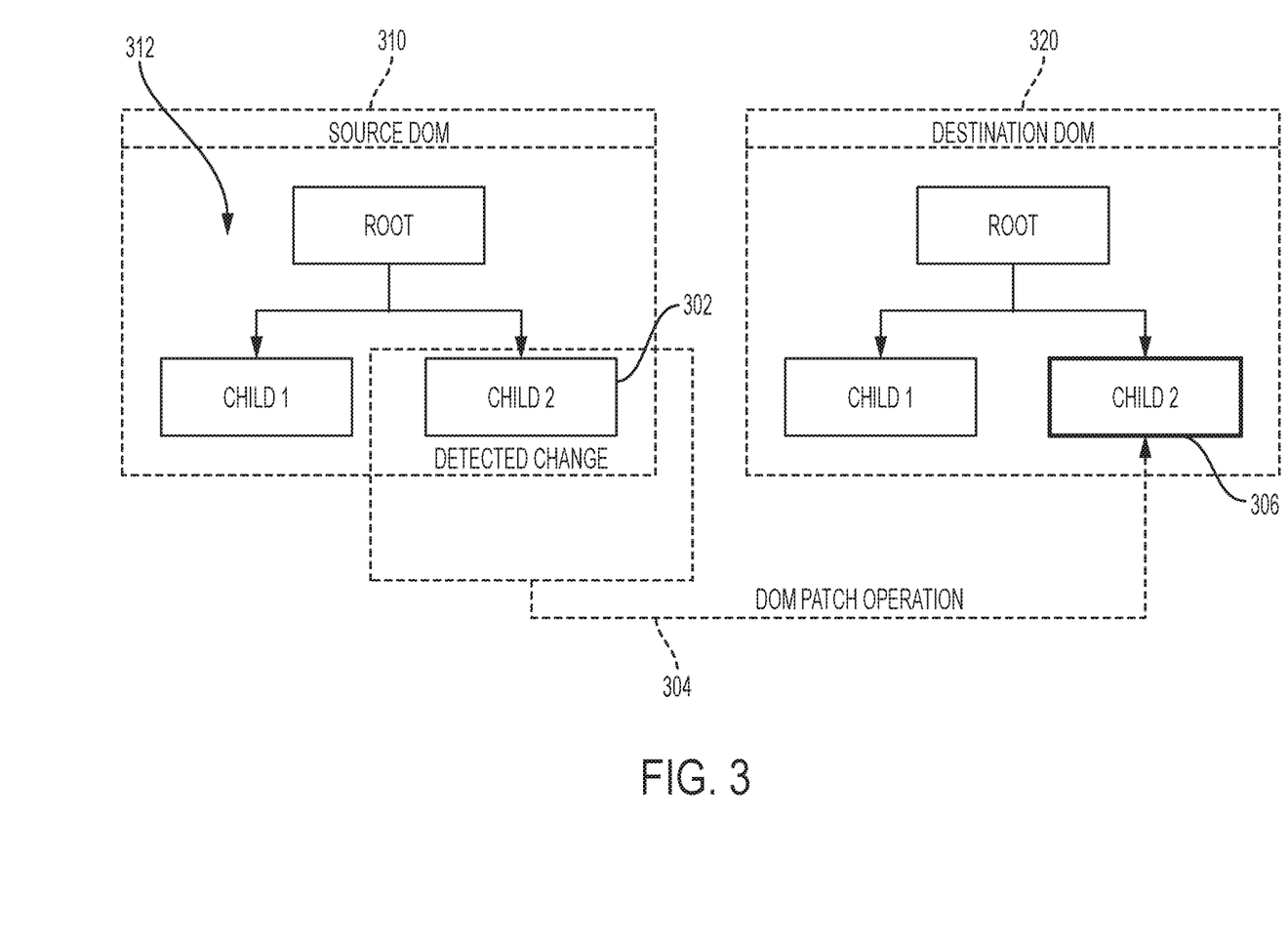
FIG. 3 illustrates an example of a DOM patch.

FIG. 3 illustrates an example of a DOM patch. In the example shown, a source DOM 310 is stored at a broadcaster node (e.g., broadcaster 102 of FIG. 1). The source DOM 310 may represent the elements of web page displayed at the broadcaster node. The destination DOM 320 may represent the elements of the same web page as displayed at one or more receiver nodes. The source DOM 310 may include a tree 312 comprising root(s) and children elements. The destination DOM 320 may include a similar tree structure.

In some configurations, using the techniques disclosed herein, the source DOM 310 may be reproduced in the destination DOM 320 in substantial real-time. One example application of this technique is streaming of a web browsing session. A web browsing session at the broadcaster node may be replicated and displayed at one or more receiver nodes. The browsing session (e.g., the display of the webpage) at the broadcaster node may be represented by the source DOM 310. The broadcaster may monitor the source DOM 310 for changes, and these changes are used to update a destination DOM 320 at one or more receiver nodes. The destination DOM 320 may include the structure of the data displayed in a browser or other interface at the receiver node.

In certain cases, a library may continuously monitor changes to the source DOM structure 310 of the source page. With each change to the structure of the page, a process may be initiated to serialize these changes into a series of patch operations that are transmitted to one or more receiver nodes. The receiver nodes may then pick up these patch operations and apply the changes to the locally held destination DOM tree 320. Based on this continuous synching of the DOM trees, the clients are able to stay consistent with the host broadcasted browser session.

In some embodiments, a web page is represented as a tree 312 of DOM objects. The interface elements in the page, such as frames, text-boxes, and buttons, are called the DOM objects. For example, the display of an HTML page is organized in layers such that the corresponding DOM objects form a tree to reflect such layers. A button DOM object may include a child of a frame object if the button resides in the frame. The root of a DOM tree 312 may represent the entire page. During web application execution, a piece of server script may generate many different broadcaster pages (e.g., DOM trees). These pages are the results of both broadcaster-side and server-side executions.

In some configurations, a virtual DOM (V-DOM) tree can represent the universal set of all such web pages, which essentially encodes the universe of possible executions on both sides. A V-DOM tree may be similar to a traditional DOM tree in that the DOM objects in the tree are concrete and valid. The difference is that a V-DOM tree includes all possible DOM objects generated by a piece of server script and these DOM objects retain the same relative positions to their containers (e.g., <div>) as in a real DOM tree generated by some execution. In some sense, one can consider a V-DOM tree the aggregation of all possible real DOM trees.

In some configurations, virtual DOM diffing techniques can be used to efficiently stream web page updates from, for example, a broadcaster to a receiver, a server to a client, etc. Virtual DOM diffing in conjunction with a virtual DOM representation can allow web page updates to be streamed more efficiently, thereby enabling smooth real-time broadcasting of a browser session.

In some cases, at a single point in time, a source DOM state may include a tree of virtual DOM elements. On the next update, the virtual DOM may change. The system then evaluates, based on the V-DOM change, how to efficiently update the user interface (UI) on the receive node. Generic approaches for minimizing the number of operations to transform one tree into another are known—however, these algorithms have a complexity in the order of $O(n^3)$, where n is the number of elements in the tree. Such known techniques may not be feasible for streaming a browser session because it may require too many comparison. For example, displaying 1000 elements could require comparisons to the order of one billion ($1000^3$).

Advantageously, the techniques disclosed herein can implement a heuristic $O(n)$ algorithm based on, inter alia, two assumptions: (1) two elements of different types will produce different trees and (2) the stability of the child elements can be inferred via a content hashing algorithm. In practice, these assumptions are valid for almost all practical use cases.

In some configurations, when diffing two trees (comparing the differences between the two trees), the techniques disclosed herein first compare the two root elements. Subsequent operations can vary depending on the types of the root elements. For example, the diffing techniques used on virtual DOM elements of different types may vary from the diffing techniques used on elements of the same type.

Elements of Different Types

In some embodiments, when root elements have different types, the techniques disclosed herein tear down or disassemble the old tree and build a new tree from scratch. For example, going from <a> to <img>, from <span> to <p>, or from <button> to <div> would lead to a full rebuild. When tearing down a tree, old DOM nodes are removed. When building up a new tree, new real DOM nodes are inserted into the DOM. Any state associated with the old tree may be lost.

Any components below the root may also be detached and have their state destroyed. For example, when diffing the following code, the old button is removed and a new button is generated:

```
<div>
    <button />
</div>
<span>
    <button />
</span>
```

Elements of the Same Type

In some configurations, when comparing two virtual DOM elements of the same type, the techniques disclosed herein evaluate the attributes of both DOMs (e.g., the source DOM and destination DOM). The same underlying DOM node may be retained, and only the changed attributes are updated. For example:

```
<div className="before" title="stuff"/>
<div className="after" title="stuff"/>
```

By comparing these two elements, the techniques disclosed herein are configured to only modify the className on the underlying DOM node. Similar techniques may be applied to other attributes of a DOM structure.

In certain instances, when updating style, the system may only update the properties that changed. For example:

```
<div style={{color: 'red', fontWeight: 'bold'}}/>
<div style={{color: 'green', fontWeight: 'bold'}}/>
```

In some cases, when converting between these two elements, the system is configured to only modify the color style (e.g., not the fontWeight).

After handling the DOM node (e.g., root node), the system recursively repeats this process on the children within the tree structure.

Recursing on Children

In some embodiments, when recursively repeating the comparison process on the children of a DOM node, the system may iterate over both lists of children at the same time and generate a mutation whenever there's a difference. This may include a default processing technique.

For example, when adding an element at the end of the children, converting between these two trees may be advantageous:

```
<ul>
    <li>first</li>
    <li>second</li>
</ul>
<ul>
    <li>first</li>
    <li>second</li>
    <li>third</li>
</ul>
```

For example, the system may match the two <li>first</li> trees, match the two <li>second</li> trees, and then insert the <li>third</li> tree.

In certain configurations, inserting a child element at the beginning may decrease performance. For example, certain approaches to converting between these two trees may be inefficient:

```
<ul>
    <li>Duke</li>
    <li>Villanova</li>
</ul>
<ul>
    <li>Connecticut</li>
    <li>Duke</li>
    <li>Villanova</li>
</ul>
```

The system may, for example, mutate every child instead of realizing it can keep the <li>Duke</li> and <li>Villanova</li> subtrees intact. This inefficiency can be a problem.

Hash Keys

In various configurations, hash keys can be used to reduce inefficiency. Before updating children of the same type, a hash key of the children may be generated based on the text content. The key may be used to match children in the original tree with children in the subsequent tree. For example, when the computation of a hash key is added to our inefficient example above can make the tree conversion efficient:

```
<ul>
    <li>Duke</li> <-- hashkey=123
    <li>Villanova</li> <-- hashkey=876
</ul>
<ul>
    <li>Connecticut</li> <-- hashkey=923
    <li>Duke</li> <-- hashkey=123
    <li>Villanova</li> <-- hashkey=876
</ul>
```

In this scenario, the system determines that the element with hash key '923' is the new element, and the elements with the hash keys '123' and '876' have moved.

In some configurations, the reconciliation algorithm may include an implementation detail and various other techniques can be used to process changes to a DOM. For example, the whole app (e.g., browser interface) could be rendered on every action, and the end result would be the same. But such an approach may require additional processing overhead.

The hashing algorithm disclosed herein can be, for example, a non-cryptographic hashing algorithm which operates as follows:

(1) The system, or network, can select a pre-set number of prime numbers above a pre-defined value are selected. For example, five prime numbers above $10^9$ may be selected. The number of prime numbers, and the prime numbers chosen, can vary from system to system and iteration to iteration.

(2) The system performs number rotations on one or more of the prime numbers. In some configurations, the system multiples the rotated prime number by a non-rotated prime numbers to form a "seed".

(3) The system adds the rotated prime numbers together, to yield a Sum. If a seed was generated, the seed is added to the Sum.

(4) Differences in content are identified and entered as inputs to a hash function. The Sum is used as a hash key for the hash function.

(5) The output of the hash function is then transmitted, as a patch or diff, to a receiving client device.

(6) The receiving client device has the hash key by performing the same rotations on the prime numbers. (In other words, the hash key is not transmitted to the receiving client device.)

(7) The receiving client device identifies the changes identified in the patch using the received hash function output and the hash key.

Traffic Balancing

In some configurations upon connection to the relay server, the client node conveys its capabilities to the relay server. A client's capabilities may include a number and type of network interfaces and its observed environment such as visible neighbors within, for example, a certain geo-IP range. The client may pass information to the relay server indicating observed network traffic quality such as ping, latency, bandwidth, and/or other network properties. The relay server may utilize such information for routing configuration. The relay server conveys configuration parameters to the client such as the surrounding backbone nodes, addressing schemes, and any server specific information. After the configuration session is complete, the client node is ready to participate in the mesh, but the security parameters for the session may be preserved for future reconfigurations.

In some configurations, a weighted hop-count is used as a routing metric. The weighted hop count may be used instead of the standard hop count. Use of a weighted hop-count facilitates preferential routing of packets via client and backbone nodes. By selecting routes which minimize this metric (e.g., weighted hop count), the mesh network may advantageously establish routes primarily comprising high speed backbone nodes. Measured bandwidth and latency may be used as weighting variables to give an approximation of network quality and performance.

Topology Sharing

In some configurations, client nodes maintain a routing table of its own local network topology. The routing table may include, for example, a destination sequenced distance vector routing table. In certain cases, the table-driven routing scheme is based on the Bellman-ford algorithm. If a client node receives new information from the relay server triggered by a specific event such as connect/disconnect, then it may use the latest sequence number. If the sequence number is the same as the one already in the table, the route with the better metric may be used. In certain instances, stale entries include entries that have not been updated for a while. Such entries as well as the routes using those nodes as next hops may be deleted.

In some embodiments, the top entries from this routing table are shared with the relay server to determine which nodes are assigned as backbone nodes. In certain instances, a threshold is used to determine a proportion of top nodes in the network designated as backbone nodes. In one example, the threshold proportion of backbone nodes to all nodes is 15 percent.

Traffic Routing

In some configurations, the relay server, in conjunction with the backbone nodes, uses its network topology cache to construct a self-configuring, secure, managed, adaptive packet forwarding scheme between the backbone and client nodes. As most of the traffic on a network may be directed to and/or from the backbone nodes, each client node may determine a path to reach one or multiple backbone nodes. Logically, each backbone node is the root of a spanning tree, and each client node attempts to participate in one or multiple such spanning trees. These spanning trees are connected to each other through high speed link between each backbone node. When each client node joins multiple spanning trees, it can distribute its load among these trees and also use them as alternative routes when nodes or links fail. In certain cases, a client node may need network bandwidth and connections to join multiple trees.

Figure 4:
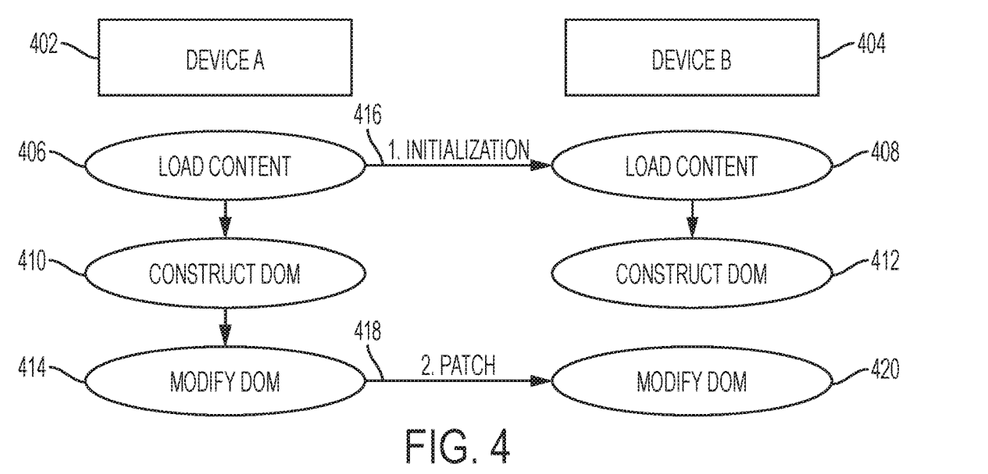
FIG. 4 illustrates exemplary communication between two nodes.

FIG. 4 illustrates exemplary communication between two nodes, Device A 402 and Device B 404. In this case, Device B 404 is configured to stream the content being displayed on Device A 402. As Device A 402 loads content, an initialization signal 416 is transmitted to Device B 404, causing device B to begin downloading/receiving the content. Preferably, the initialization signal 416 is smaller than the content to be loaded. Both Device A 402 and Device B 404 respectively receive, load, and display the content, which can include respectively constructing DOM structures 410, 412. As the user of Device A 402 modifies a DOM structure 414 within the downloaded and displayed content, Device A 402 generates a patch 418, which is transmitted through the mesh network to Device B 420. The patch (which can also be called a diff) provides details regarding changes to the DOM structure, not the entirety of the DOM structure being modified.

To further reduce the bandwidth required, the DOM structure can have a version number. When new content (diffs, or patches) are received, the version number of the local version can be compared to that of the received version. If the received patch has a newer, higher version, then the new content can be merged with the current DOM. If the received patch has a lower, older version than the current content, then the received patch can be discarded.

Figure 5:
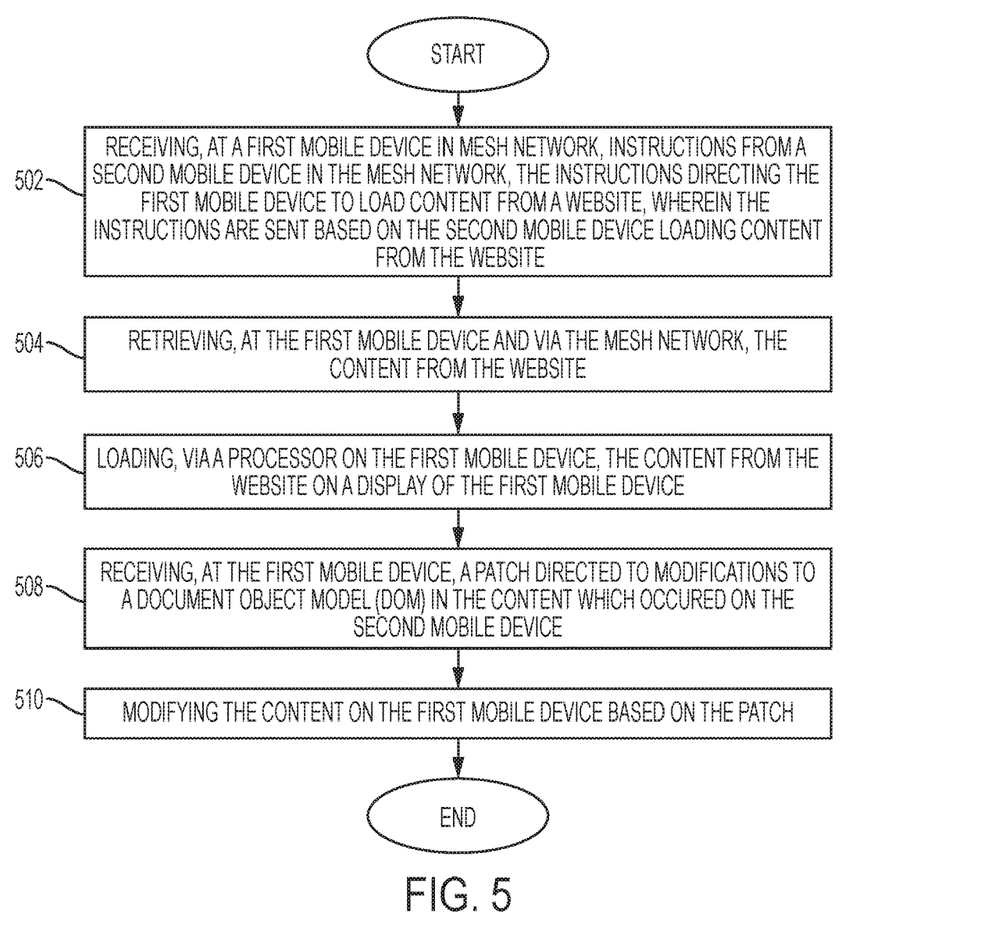
FIG. 5 illustrates an exemplary method embodiment.

FIG. 5 illustrates an exemplary method embodiment. In this example, a first mobile device in mesh network receives instructions from a second mobile device in the mesh network, the instructions directing the first mobile device to load content from a website, wherein the instructions are sent based on the second mobile device loading the content from the website (502). The first mobile device retrieves, via the mesh network, the content from the website (504) and loads, via a processor, the content from the website on a display of the first mobile device (506). The mobile device receives a patch directed to modifications to a Document Object Model (DOM) in the content which occurred on the second mobile device (508) and modifies modifying the content on the first mobile device based on the patch (510).

In some configurations, the patch can utilize a rotational hashing function. The rotational hashing function can include predefining a plurality of prime numbers, rotating the plurality of prime numbers, to yield rotated prime numbers, performing a respective hash function on each of the prime numbers in the rotated prime numbers, to form a hash key, and using the hash key to perform a hash function on the modifications, wherein the patch is a hashed output of the hash function.

In some configurations, traffic within the mesh network is directed using a voted-upon gateway node in the mesh network. In such configurations, the voting process to determine the voted-upon gateway node has each node in the mesh network assigned a number of stakes to be used in voting for the voted-upon gateway node, the stakes being based on a moving average of each respective node's traffic over a period of time. For example, the number of stakes given to a node may be based on the traffic through that node of the past day, the past twenty minutes, etc.

In some configurations, the modifications to the DOM can be placed in an interactive layer above the content from the website. In such configurations, the modifications in the interactive layer can fade on both the first mobile device and the second mobile device after a pre-set period of time. For example, as content is loaded by a node and displayed, a "canvas" or other interaction layer is placed on top of the base HTML (or other protocol) content. Any modifications done by the user do not modify the base content, but rather the interaction layer. As these modifications occur, the points of modification are transmitted to other nodes which are streaming/replicating the displayed content. However, in this case, the diffs (points of distinction) are only with reference to the interaction layer, not the base content. In addition, the changes made can be time stamped, such that over time the changes fade, until the changes totally disappear after a preset amount of time.

As an additional example, consider the following scenario. User B is streaming the content shown in User A's browser window. User A puts a "sticker" (or other modification) on a webpage at location (x, y). The sticker can then show up on the interactive canvas for the streamed browser of User B. The sticker can fade out for both User A and User B after a preset amount of time.

Figure 6:
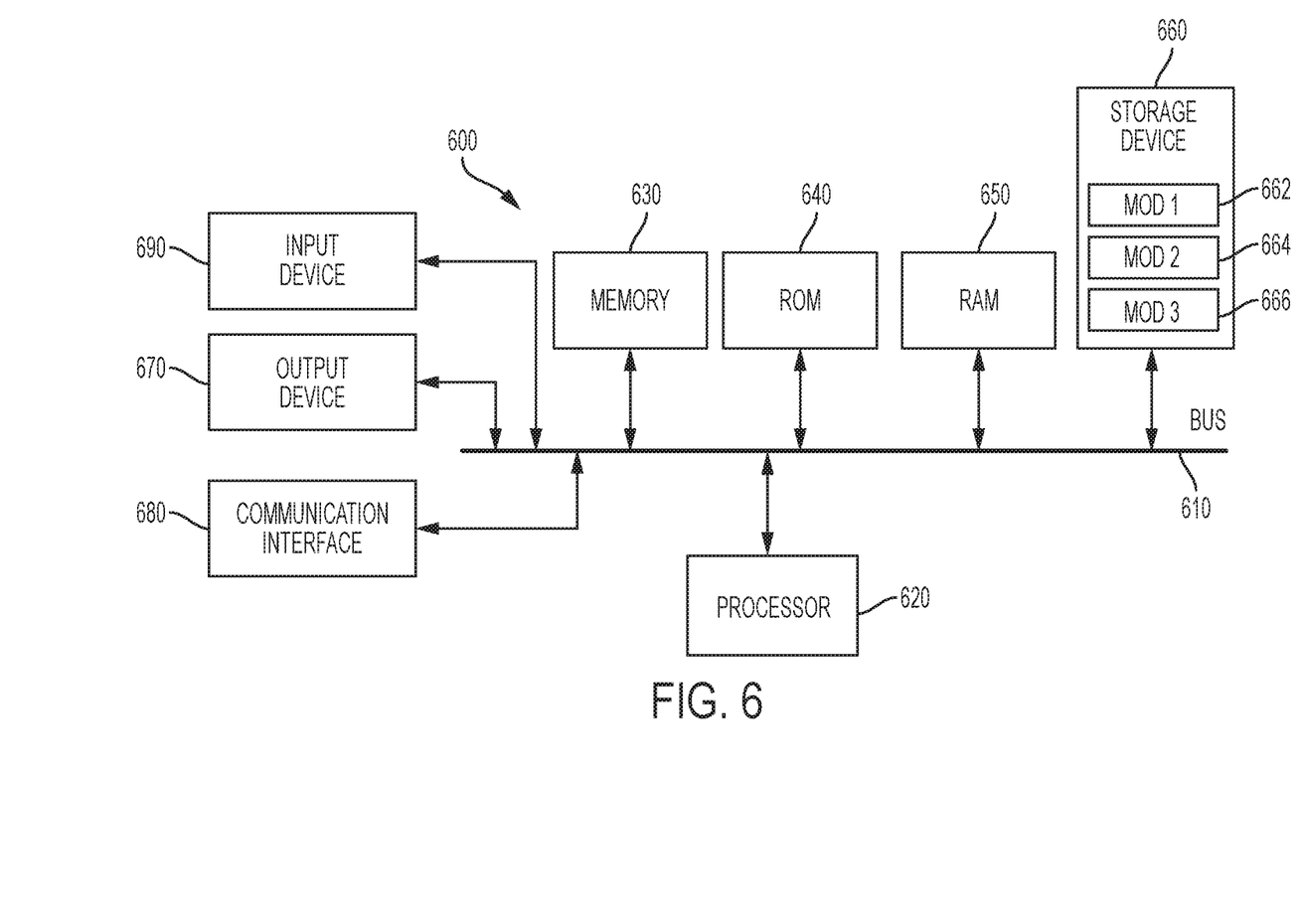
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, at a first mobile device in mesh network, instructions from a second mobile device in the mesh network, the instructions directing the first mobile device to load content from a website, wherein the instructions are sent based on the second mobile device loading the content from the website;
   retrieving, at the first mobile device and via the mesh network, the content from the website; loading, via a processor on the first mobile device, the content from the website on a display of the first mobile device;
   receiving, at the first mobile device, a patch directed to modifications to a Document Object Model (DOM) in the content which occurred on the second mobile device, wherein the patch utilizes a rotational hashing function which:
   predefines a plurality of prime numbers;
   performs a rotation of the plurality of prime numbers, to yield rotated prime numbers;
   performs a respective hash function on each of the prime numbers in the rotated prime numbers, to form a hash key; and
   uses the hash key to perform a hash function on the modifications, wherein the patch is a hashed output of the hash function; and
   modifying the content on the first mobile device based on the patch.

2. The method of claim 1, wherein the mesh network directs traffic within the mesh network using a voted-upon gateway node in the mesh network.

3. The method of claim 2, wherein each node in the mesh network is assigned a number of stakes to be used in voting for the voted-upon gateway node, the number of stakes being based on a moving average of each respective node's traffic over a period of time.

4. The method of claim 1, wherein the modifications to the DOM are placed in an interactive layer above the content from the website.

5. The method of claim 4, wherein the modifications in the interactive layer fade on both the first mobile device and the second mobile device after a pre-set period of time.

6. A system comprising:
a processor; and
a computer-readable storage medium having instructions stored which, when executed by the processor, cause the processor to perform operations comprising:
receiving, at a first mobile device in mesh network, instructions from a second mobile device in the mesh network, the instructions directing the first mobile device to load content from a website, wherein the instructions are sent based on the second mobile device loading the content from the website;
retrieving, at the first mobile device and via the mesh network, the content from the website;
loading, on the first mobile device, the content from website on a display of the first mobile device;
receiving, at the first mobile device, a patch directed to modifications to a Document Object Model (DOM) in the content which occurred on the second mobile device, wherein the patch utilizes a rotational hashing function which:
predefines a plurality of prime numbers;
performs a rotation of the plurality of prime numbers, to yield rotated prime numbers;
performs a respective hash function on each of the prime numbers in the rotated prime numbers, to form a hash key; and
uses the hash key to perform a hash function on the modifications, wherein the patch is a hashed output of the hash function; and
modifying the content on the first, mobile device based on the patch.

7. The system of claim 6, wherein the mesh network directs traffic within the mesh network using a voted-upon gateway node in the mesh network.

8. The system of claim 7, wherein each node in the mesh network is assigned a number of stakes to be used in voting for the voted-upon gateway node, the number of stakes being based on a moving average of each respective node's traffic over a period of time.

9. The system of claim 6, wherein the modifications to the DOM are placed in an interactive layer above the content from the website.

10. The system of claim 9, wherein the modifications in the interactive layer fade on both the first mobile device and the second mobile device after a pre-set period of time.

11. A non-transitory computer-readable storage medium having instructions stored which, when executed by a computing device, cause the computing device to perform operations comprising:
receiving, at a first mobile device in mesh network, instructions from a second mobile device in the mesh network, the instructions directing the first mobile device to load content from a website, wherein the instructions are sent based on the second mobile device loading the content from the website;
retrieving, at the first mobile device and via the mesh network, the content from the website; loading, on the first mobile device, the content from the website on a display of the first mobile device;
receiving, at the first mobile device, a patch directed to modifications to a Document Object Model (DOM) in the content which occurred on the second mobile device, wherein the patch utilizes a rotational hashing function which:
predefines a plurality of prime numbers;
performs a rotation of the plurality of prime numbers, to yield rotated prime numbers;
performs a respective hash function on each of the prime numbers in the rotated prime numbers, to form a hash key; and
uses the hash key to perform a hash function on the modifications, wherein the patch is a hashed output of the hash function; and
modifying the content on the first mobile device based on the patch.

12. The non-transitory computer-readable storage medium of claim 11, wherein the mesh network directs traffic within the mesh network using a voted-upon gateway node in the mesh network.

13. The non-transitory computer-readable storage medium of claim 12, wherein each node in the mesh network is assigned a number of stakes to be used in voting for the voted-upon gateway node, the number of stakes being based on a moving average of each respective node's traffic over a period of time.

14. The non-transitory computer-readable storage medium of claim 11, wherein the modifications to the DOM are placed in an interactive layer above the content from the website.

* * * * *